United States Patent [19]

Dickhut et al.

[11] Patent Number: 5,059,109
[45] Date of Patent: Oct. 22, 1991

[54] CORRUGATED MOLD BLOCK

[75] Inventors: Heinrich Dickhut, Charleston; John S. Berns, Cleveland, both of Tenn.

[73] Assignee: Cullom Machine Tool & Die, Inc., Cleveland, Tenn.

[21] Appl. No.: 456,973

[22] Filed: Dec. 26, 1989

[51] Int. Cl.$^5$ .............................................. B29C 49/38
[52] U.S. Cl. ..................................... 425/233; 425/532;
425/539; 425/370; 425/371; 425/388; 425/392
[58] Field of Search ............... 425/325, 369, 504, 505,
425/370, 72.1, 75, 387.1, 336, 233, 508, 509,
522, 526, 532, 538, 539, 540, DIG. 30, 395, 396,
388, 392, 405.1, 371; 72/190

[56] References Cited

U.S. PATENT DOCUMENTS

| | | | |
|---|---|---|---|
| 1,984,384 | 12/1934 | Sheffield | 425/DIG. 30 |
| 3,914,101 | 10/1975 | Stefanka | 425/387.1 |
| 4,199,314 | 4/1980 | Lupke et al. | 425/539 |
| 4,226,580 | 10/1980 | Lupke et al. | 425/505 |
| 4,319,872 | 3/1982 | Lupke et al. | 425/532 |
| 4,439,130 | 3/1984 | Dickhut et al. | 425/388 |
| 4,492,551 | 1/1985 | Hegler et al. | 425/233 |
| 4,718,844 | 1/1988 | Dickhut et al. | 425/336 |

Primary Examiner—Willard E. Hoag
Attorney, Agent, or Firm—Wood, Phillips, Mason, Recktenwald & VanSanten

[57] ABSTRACT

A corrugated mold block for a vacuum machine for molding corrugated tubes is formed of a plurality of sub-blocks rigidly secured end to end. Each sub-block has an arcuate face which is corrugated with not more than one complete wavelength of circumferential grooves and lands, and two longitudinally spaced end surfaces. A vacuum channel is provided about one of the end surfaces of each sub-block, and openings in each sub-block connect the channel and the face. When the sub-blocks are secured together into a mold block (and when mold blocks abut during molding), the vacuum channels and openings together define vacuum passages for each of the corrugation grooves, which passages are all connected to a vacuum source for drawing a vacuum during molding.

6 Claims, 4 Drawing Sheets

CORRUGATED MOLD BLOCK

BACKGROUND OF THE INVENTION

1. Technical Field

The present invention relates to mold blocks, and more particularly to mold blocks which circulate about an endless path to vacuum form corrugated tubes.

2. Background Art

A well known method for manufacturing corrugated pipes is to extrude a tube of thermoplastic from a head and then conform that tube to the interior of a corrugated mold tunnel formed by mold blocks. The mold blocks typically come in pairs and mate together to form a portion of the mold tunnel, and the thermoplastic is either blown into its shape (by pressure created within the mold tunnel) or by vacuum (where vacuum draws the air from around the mold tunnel).

Structures which have been used in the vacuum method of manufacture are illustrated in U.S. Pat. Nos. 4,319,872, 4,439,130, and 4,718,844. These patents all address the problem of drawing a uniform, strong vacuum around the entirety of the mold blocks which are continually moving during the molding process. As can be seen from these structures, it is difficult to inexpensively form any such mold block.

SUMMARY OF THE INVENTION

In one aspect of the present invention, a corrugated mold block for a vacuum machine for molding corrugated tubes is formed of a plurality of sub-blocks rigidly secured end to end. Each sub-block has an arcuate face which is corrugated with not more than one complete wavelength of circumferential grooves and lands, and two longitudinally spaced end surfaces. A vacuum channel is provided about one of the end surfaces of each sub-block, and openings in each sub-block connect the channel and the face. When the sub-blocks are secured together into a mold block (and when mold blocks abut during molding), the vacuum channels and openings together define vacuum passages for each of the corrugation grooves, which passages are all connected to a vacuum source for drawing a vacuum during molding.

In another aspect of the present invention, a method of making a corrugated mold block is described, comprising the steps of: (1) casting a plurality of metal sub-blocks each having a face substantially arcuate about a longitudinal axis and corrugated with not more than one complete wavelength of circumferential grooves and lands, two longitudinally spaced end surfaces, a vacuum channel about one of the end surfaces open to the outside of the sub-block, and openings between the face and the channel; (2) aligning the formed sub-blocks longitudinally with end surfaces abutting and their faces forming a semicircular, longitudinally disposed continuous corrugation; and (3) rigidly securing the aligned sub-blocks together.

It is an object of the present invention to provide a mold block adapted to draw a strong and uniform vacuum about the mold tunnel in order to properly conform the thermoplastic to the desired corrugated tubular shape, while at the same time minimizing the complexity and cost of the mold block.

DESCRIPTION OF THE PREFERRED EMBODIMENT

Figure 1:
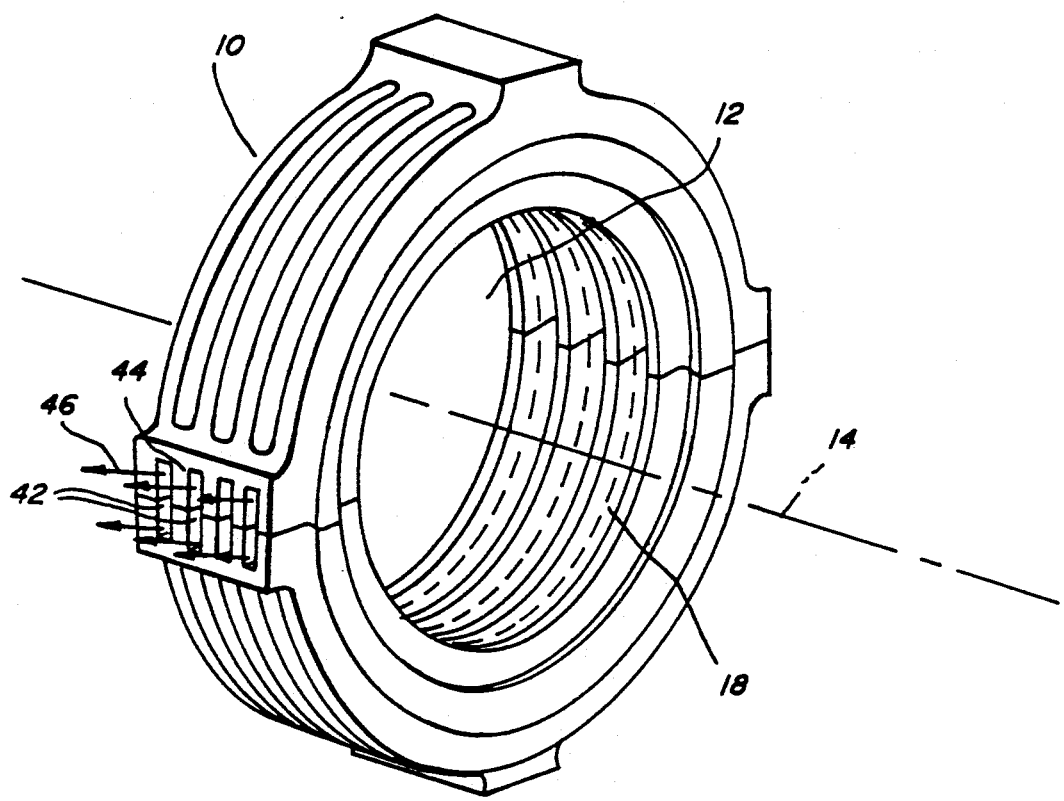
FIG. 1 is a perspective view of a pair of mold blocks embodying the present invention.

A pair of mating mold blocks 10 is shown in perspective in FIG. 1. When together as shown in FIG. 1, each mold block forms a portion of a mold tunnel 12 about a longitudinal axis 14. With the embodiment illustrated in FIG. 1, two mold blocks would be circulated about an endless track or path with the mold blocks 10 separated as the blocks pass an extruder head (which dispenses heated, thermoplastic in a cylindrical fashion). The mold blocks 10 are then brought together as shown in FIG. 1 to define the mold tunnel 12 (together with adjacent pairs of mold blocks), and a vacuum draws the thermoplastic against the walls of the mold tunnel 12 to form the corrugated tube or pipe.

It should be noted that the two mold blocks 10 could be carried about one track pivotally by a single carriage in a clam shell type of operation such as shown in U.S. Pat. No. 4,439,130, or alternatively the mold blocks 10 could be used in a system such as that shown in U.S. Pat. No. 4,319,872, with the two mold blocks of each pair carried on opposite endless tracks, mated together along a portion of the tracks to form a mold tunnel.

Reference will now be made to the detailed structure of a mold block 10 of the present invention. Though only one mold block 10 will be described, it should be understood that the other mold block 10 in each pair will be identical to (and turned 180 degrees from) the mold block 10 being described.

Figure 2:
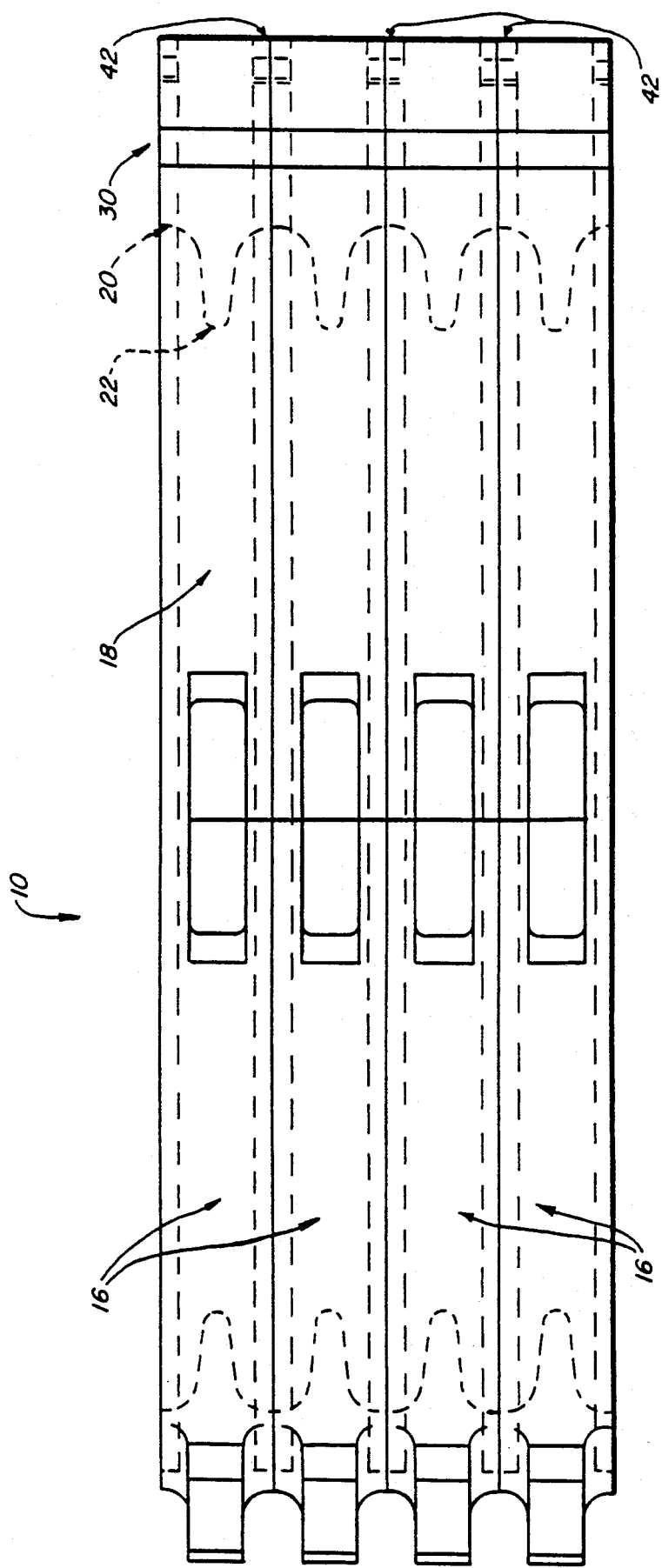
FIG. 2 is a top view of a mold block embodying the present invention.
Figure 3:
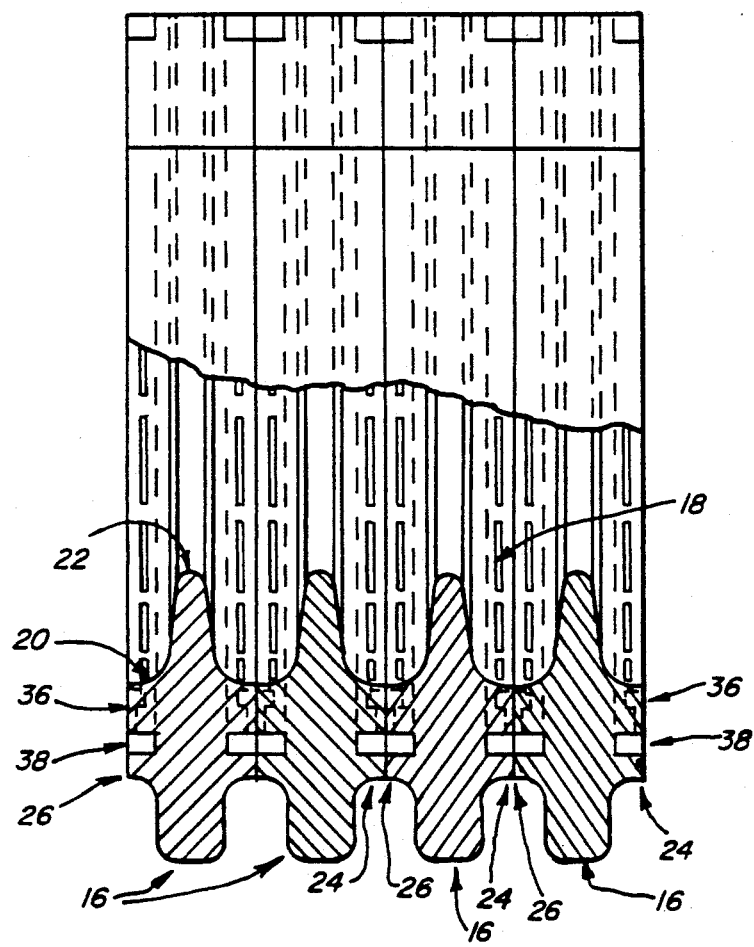
FIG. 3 is a sectional view of a mold block embodying the present invention.

As best shown in FIGS. 1-3, the mold block 10 comprises a plurality of adjacent sub-blocks 16 adjoined so as to define a continuous corrugated surface 18 with alternating grooves 20 and lands 22 and substantially arcuate 180 degrees about the longitudinal axis 14 (see FIG. 1). The grooves 20 and lands 22 of each sub-block extend up to one complete wavelength (i.e., the width of one groove 20 and one land 22), so that when together, the mold block face defines a continuous corrugated surface through the mold tunnel 12.

Adjacent sub-blocks 16 are mated at their front end face or surface 24 and the rear end face or surface 26, respectively. The sub-blocks 16 defining the mold block 10 (four such sub-blocks are shown in FIG. 3) are aligned by a dowel 28 fitted into countersunk fastener passageways 30 of each pair of adjacent sub-blocks 16. Bolts 32 run coaxially through the dowels 28 the length of the mold block 10, and secure the sub-blocks 16 together by tightening of the bolts 32 and nuts 33 (the nuts and bolt heads reside in the outer fastener passageways in the end sub-blocks 16).

A plurality of slits 34 are disposed at the grooves 20 of the sub-blocks 16 and are connected to a plurality of vacuum ports 36. The ports 36 are in turn in communication with semicircular grooves 38 cast in the end faces 24, 26 of each sub-block 16 which, when the sub-blocks 16 are secured together as described above define a continuous circular vacuum passage 40. When adjacent mold blocks 10 are closed, a similar vacuum passage 40 is created between the adjacent mold blocks 10.

As will be understood by a skilled artisan, mold blocks of the present invention could also be made with semicircular grooves in only one end face of each sub-block 16. Similarly, it will be understood by a skilled artisan that the interior face slits could directly communicate with the semicircular groove in the sub-block end faces, and that the semicircular grooves could be less than 180 degrees, and in fact non-connected arcuate grooves can be used with systems where more than one vacuum source is provided.

Figure 4:
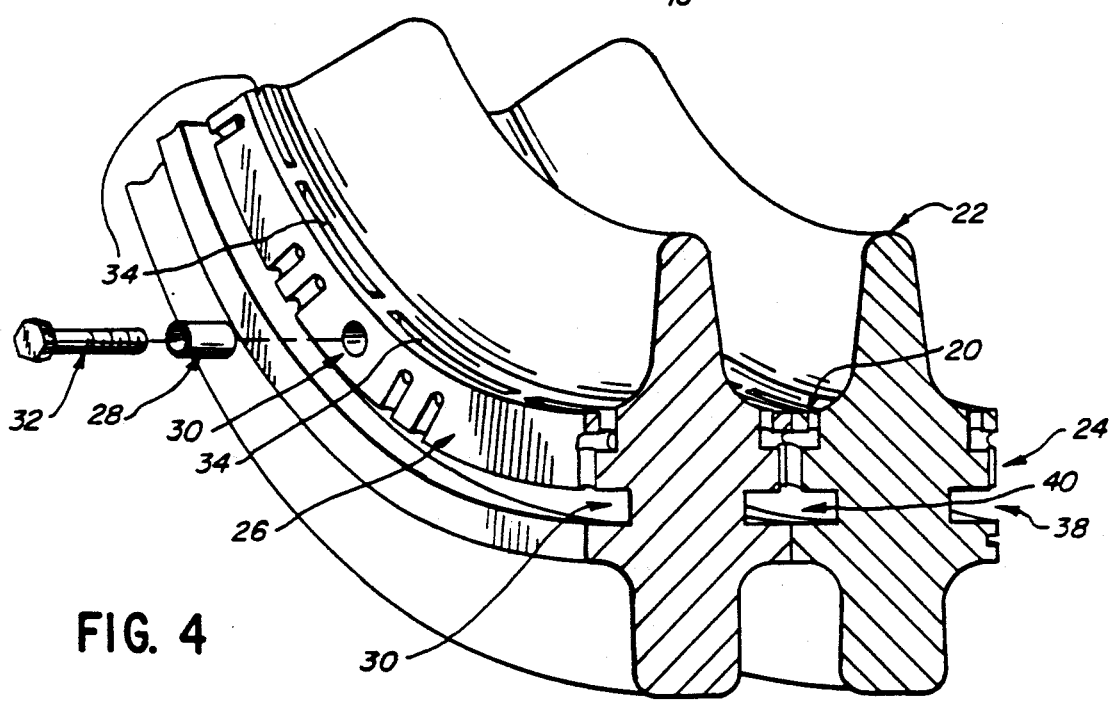
FIG. 4 is an exploded sectional view of two sub-blocks embodying the present invention.
Figure 5:
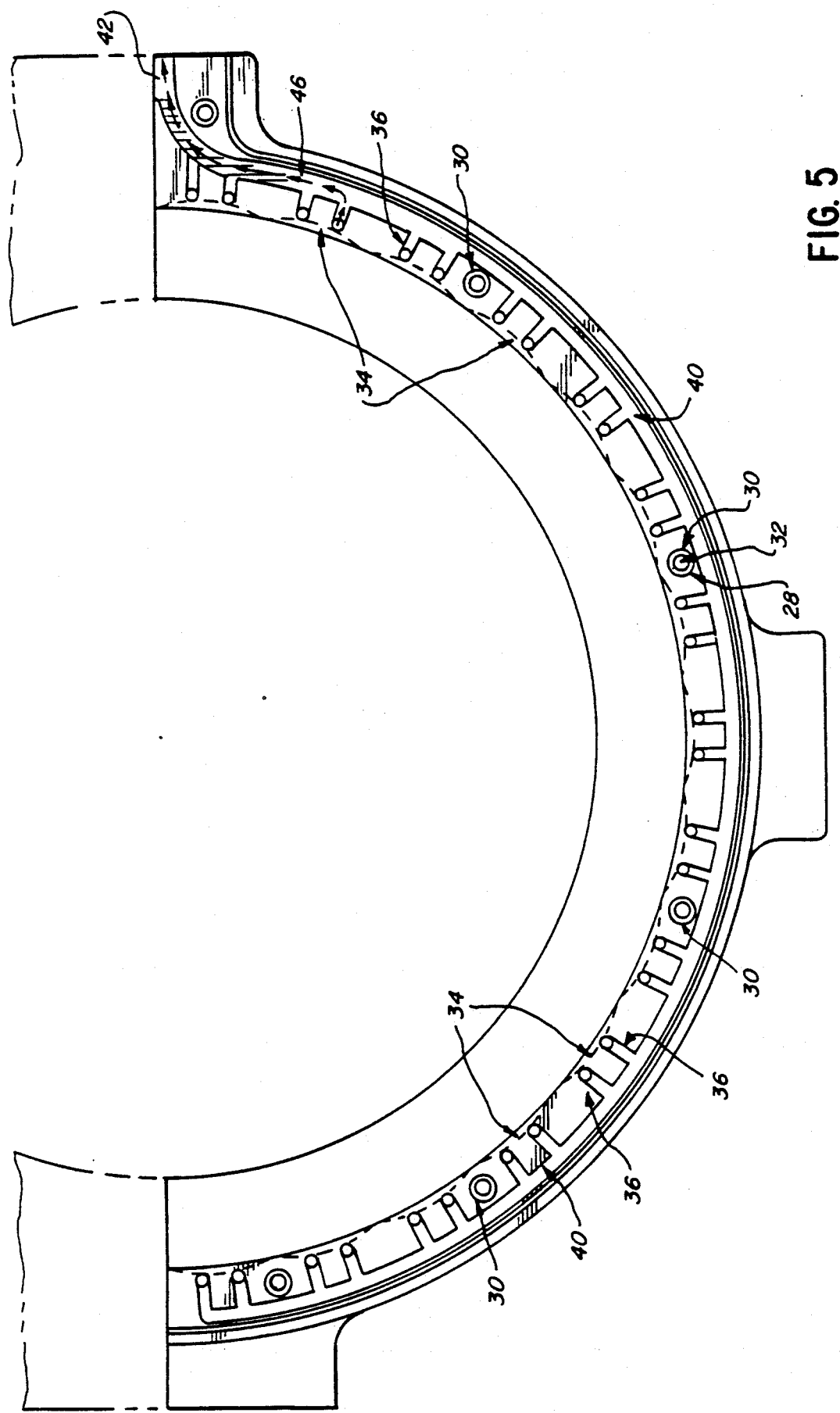
FIG. 5 is a side view of a mold block embodying the present invention.

Each vacuum passage 40 is also open into a vacuum channel 42 which, together with a mating channel of the other mold block 10 of each pair, define a vacuum header 44 open at the top of the mold block pair (see FIGS. 4 and 5). This arrangement of grooves 20 and lands 22 within each sub-block 16 permits the dedication of a vacuum passage 40 to each groove 20 of the corrugated surface 18, thereby inducing a strong, uniform vacuum at each groove 20 of the mold tunnel 12.

As will be understood by a skilled artisan, one or more vacuum manifolds can be provided adjacent the mold tunnel 12 so as to communicate with the vacuum header 44 during molding. Accordingly, as indicated by the arrows 46, a vacuum is drawn through the vacuum header 44, the vacuum passages 40 defined by the end face grooves 38, the vacuum ports 36, and the vacuum slits 34, thereby assuring that the thermoplastic properly conforms to the mold tunnel 12.

As should also be understood by a skilled artisan, the present invention can also be practiced by using sub-blocks which are arcuate through less than 180 degrees (for example, a single large mold block could also be formed by suitably rigidly connecting together sub-blocks which are not more than one complete wavelength long but have faces curving only 90 degrees).

As should also be understood by a skilled artisan, the present invention could similarly be practiced through the use of selected longitudinal bores through the sub-blocks in order to connect a couple of the vacuum passages so that only one vacuum channel to the header need be provided for the connected passages.

The above described structure will thus draw a strong and uniform vacuum about the mold tunnel in order to properly conform the thermoplastic to the desired corrugated tubular shape, while at the same time minimizing the complexity and cost of the mold block.

Still other aspects, objects, and advantages of the present invention can be obtained from a study of the drawings, the specification and the appended claims.

I claim:

1. A corrugated mold block for a vacuum machine for molding corrugated tubes, said block being movable about an endless path and cooperating with other blocks to define a molding tunnel with a vacuum source along a portion of said path, said block comprising:
   a plurality of sub-blocks secured end to end, each sub-block having
      a face substantially arcuate about a longitudinal axis and corrugated with not more than one complete wavelength of circumferential grooves and lands for defining a portion of the mold tunnel,
      two longitudinally spaced end surfaces wherein additional sub-blocks may be adjoined so as to extend said tunnel in a longitudinal direction;
      a vacuum channel about one of said end surfaces and spaced from said face, and
      means for defining openings between said face and said channel;
   whereby the vacuum channels and defined openings of abutting sub-blocks together define a vacuum passage; and
   means for connecting said vacuum passage to the vacuum source when the mold block passes along said mold tunnel.

2. The corrugated mold block of claim 1 wherein said face of each sub-blocks comprises one circumferential land symmetrically flanked by two circumferential half grooves.

3. The corrugated mold block of claim 2, wherein said sub-blocks when secured together in a mold block define a continuum of substantially semicircular evenly spaced circumferential grooves and lands.

4. The corrugated mold block of claim 1, wherein at least one vacuum channel is closed by abutment of the end surface of an adjacent secured sub-blocks.

5. The corrugated mold block of claim 1 wherein the defined openings comprise vacuum ports radiating outwardly from said face to said vacuum channels.

6. The corrugated mold block of claim 1, further comprising a plurality of aligned longitudinal passages through said sub-blocks and a fastener extending through said aligned passages and securing a selected plurality of sub-blocks together into a mold block.

* * * * *